(12) United States Patent
Mitchell et al.

(10) Patent No.: US 7,168,557 B2
(45) Date of Patent: Jan. 30, 2007

(54) SIDE-FLEXING CONVEYOR CHAIN HAVING MEMBERS JOINED BY LINKAGES

(75) Inventors: Robert E. Mitchell, Milwaukee, WI (US); James C. Stebnicki, Glendale, WI (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 11/005,615

(22) Filed: Dec. 6, 2004

(65) Prior Publication Data

US 2006/0118396 A1 Jun. 8, 2006

(51) Int. Cl.
*B65G 17/06* (2006.01)

(52) U.S. Cl. ....................... 198/852; 198/853
(58) Field of Classification Search ................ 198/850, 198/851, 852, 853
See application file for complete search history.

(56) References Cited

U.S. PATENT DOCUMENTS

| | | | |
|---|---|---|---|
| 2,010,124 A | 8/1935 | Worrall | |
| 2,655,250 A | 10/1953 | Woolling | |
| 2,704,943 A | 3/1955 | Harris | |
| 3,513,965 A | 5/1970 | Miller | |
| 3,572,948 A | 3/1971 | Hammitt | |
| 3,854,575 A | 12/1974 | Fraioli, Sr. | |
| 3,865,229 A | 2/1975 | Velander | |
| 4,153,152 A | 5/1979 | Lapeyre | |
| RE30,035 E | 6/1979 | Miller | |
| 4,222,483 A | 9/1980 | Wootton et al. | |
| 4,276,980 A * | 7/1981 | Oizumi | 198/851 |
| 4,290,762 A | 9/1981 | Lapeyre | |
| 5,407,061 A * | 4/1995 | Okada et al. | 198/812 |
| 5,429,227 A * | 7/1995 | Krossmann et al. | 198/852 |
| 5,573,105 A | 11/1996 | Palmaer | |
| 5,678,683 A | 10/1997 | Stebnicki et al. | |
| 6,036,001 A | 3/2000 | Stebnicki et al. | |
| 6,142,295 A | 11/2000 | Greve | |
| 6,401,914 B1 | 6/2002 | Greve | |
| 6,526,740 B1 * | 3/2003 | Tanemoto et al. | 59/5 |
| 6,527,106 B2 * | 3/2003 | Tanabe et al. | 198/853 |
| 6,615,979 B2 | 9/2003 | Etherington et al. | |
| 2003/0136647 A1 | 7/2003 | Knott et al. | |

FOREIGN PATENT DOCUMENTS

| | | |
|---|---|---|
| DE | 20 58 593 A1 | 5/1972 |
| EP | 0 621 851 B1 | 6/1998 |

OTHER PUBLICATIONS

European Search Report dated Jan. 27, 2006.

* cited by examiner

*Primary Examiner*—Joe Dillon, Jr.
(74) *Attorney, Agent, or Firm*—Quarles & Brady LLP (57) ABSTRACT

A side-flexing conveyor chain module includes a first module member having at least two first link ends, a second module member having at least two second link ends, and linkages linking at least one of the first link ends to at least one of the second link ends. Separating the chain module into module members and linking the module members together by linkages distributes the chain tension across the width of the chain module, and thus the hinge pin joining adjacent chain modules.

32 Claims, 11 Drawing Sheets

SIDE-FLEXING CONVEYOR CHAIN HAVING MEMBERS JOINED BY LINKAGES

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The field of invention is modular conveyor chains and belts, and more particularly, side-flexing modular conveyor chains and belts.

Side-flexing modular conveyor chains and belts are typically formed from a plurality of chain links pivotally linked about a horizontal axis by a hinge pin. Each link has a leading edge side including a plurality of eyes that are interdigitated with a plurality of eyes formed in a trailing edge side of an adjacent link. In most known side-flexing chains and belts, coaxial slotted holes formed in the eyes receive the hinge pin to pivotally link the adjacent links together about a horizontal axis.

The eyes are slotted to allow the chain or belt to side-flex, or travel along a curve. When side-flexing, the portion of the links on the inside of the curve collapse, or are forced closer to together, while the portion of the links on the outside of the curve expand, or are pulled apart, to allow the chain or belt to travel along the curve. As a result all of the tension when side-flexing is carried in the outer most eye of the links and the outermost eye and shear point on the hinge pin carries the entire load of the chain tension which can cause premature failure. Therefore, a need exists for a side-flexing conveyor chain module that distributes chain tension across the width of the chain module

BRIEF SUMMARY OF THE INVENTION

The present invention provides a side-flexing conveyor chain module including a first module member having at least two first link ends, a second module member having at least two second link ends, and linkages linking the module members together. Separating the chain module into module members and linking the module members together by linkages distributes the chain tension across the width of the chain module, and thus the hinge pin joining adjacent chain modules.

A general objective of the present invention is to provide a chain module that distributes chain tension across the width of the module. This objective is accomplished by separating the chain module into module members and linking the module members together by linkages to distribute the chain tension across the width of the chain module, and thus the hinge pin joining adjacent chain modules.

The foregoing and other objectives and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
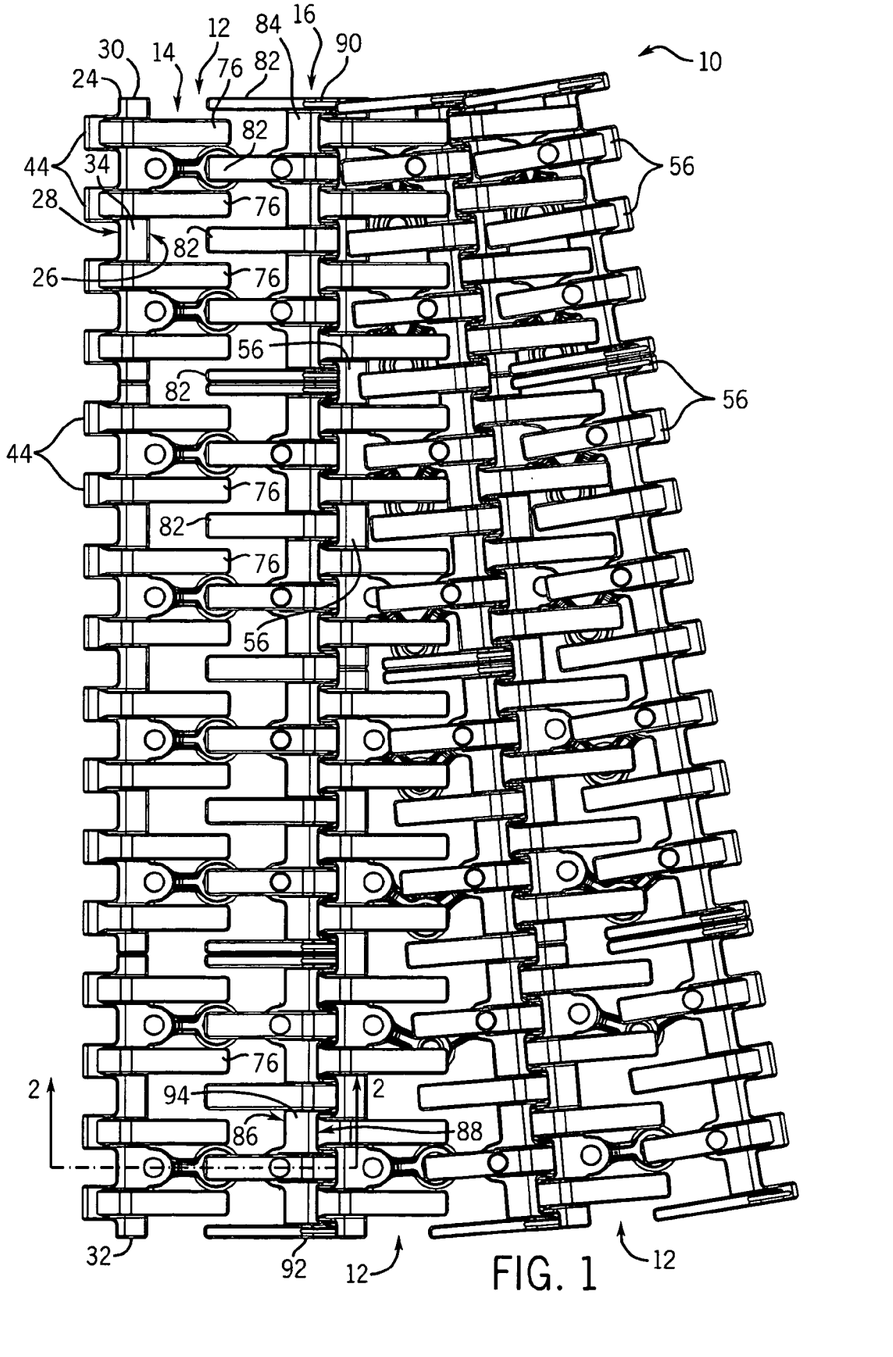
FIG. 1 is a top view of a side-flexing conveyor chain incorporating the present invention.
Figure 2:
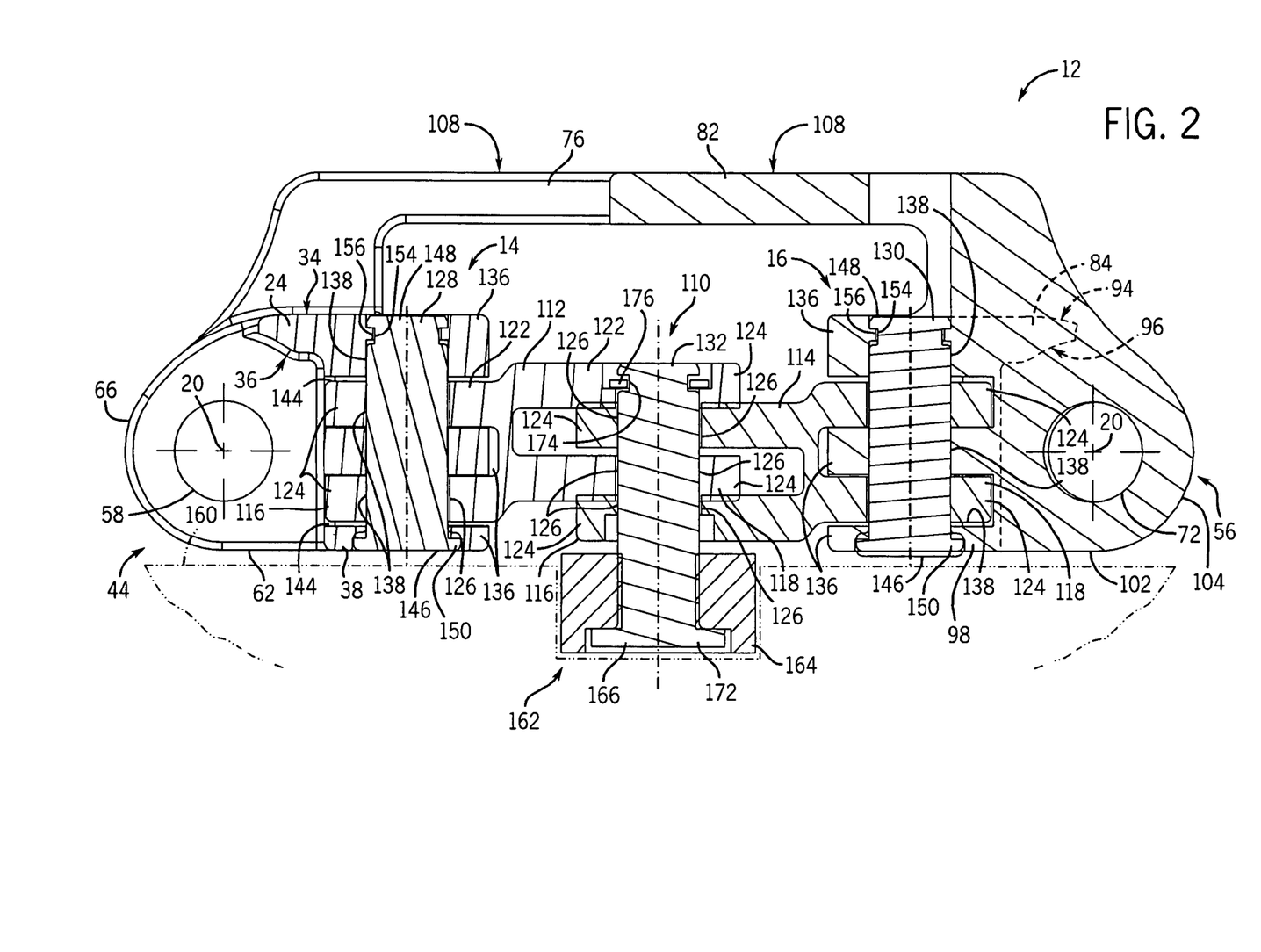
FIG. 2 is a sectional view along line 2—2 of FIG. 1.
Figure 3:
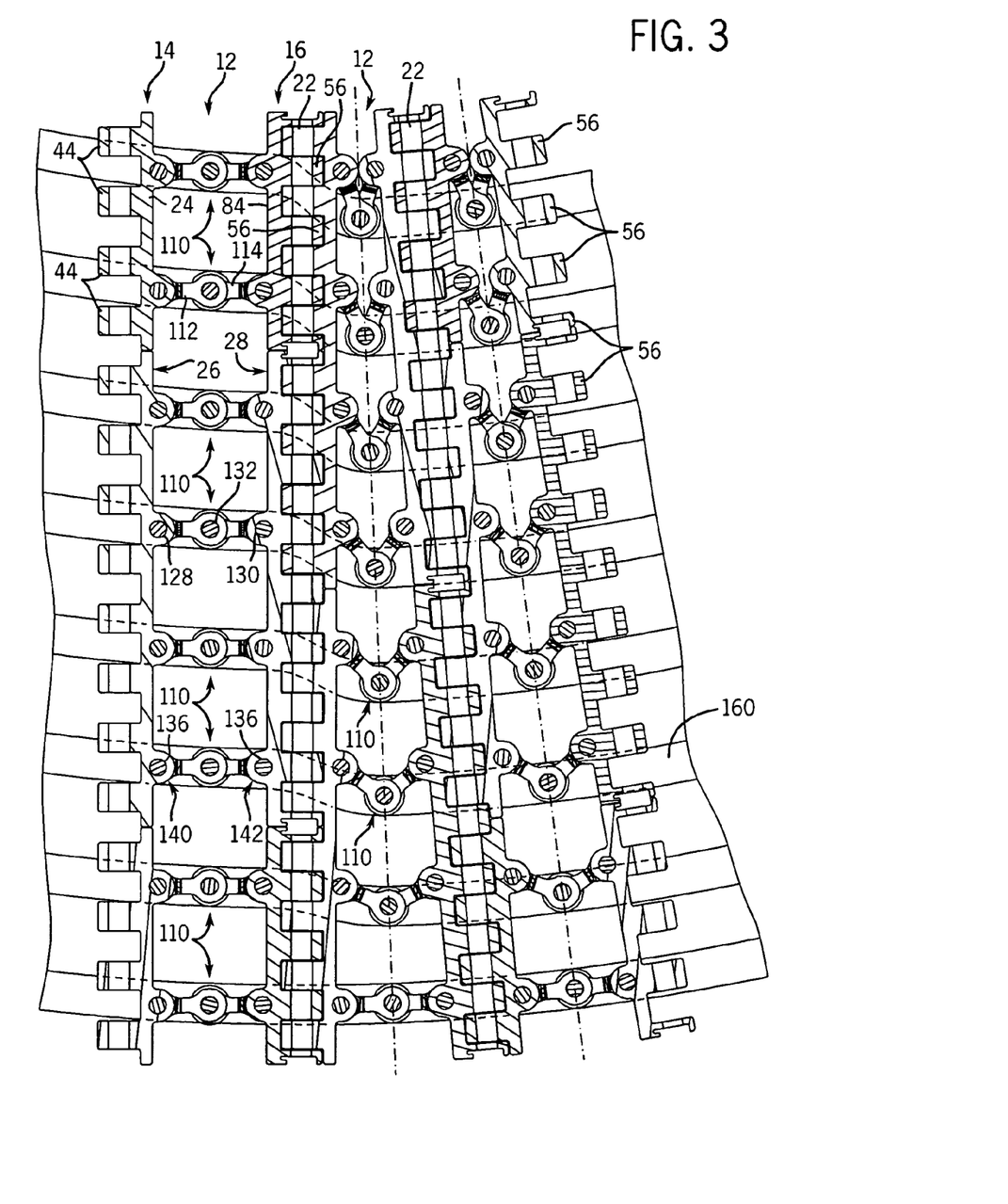
FIG. 3 is a sectional view of the chain of FIG. 1 along line 3—3 of FIG. 2.

A side-flexing modular chain 10 incorporating the present invention and shown in FIGS. 1–3 distributes chain tension across the width of the chain modules 12 as the chain 10 negotiates a curve. Each chain module 12 includes a first module member 14 pivotally linked to a second module member 16. Each module 12 is pivotally joined to adjacent modules 12 about a horizontal axis 20 defined by a hinge pin 22. Although the term chain is used herein to describe the preferred embodiment, the present invention can also be a belt. Accordingly, when the term chain is used in this description, it is also understood to include a belt.

The first module member 14 includes a body 24 having an inner side 26 and an outer side 28 joined by ends 30, 32 and a body top 34 and body bottom 36. A transverse rib 38 extends downwardly from the body bottom 36 and between the body ends 30,32 to stiffen the first module member 14. Link ends 44 extend from the outer side 28 and transverse rib 38 and interdigitate with link ends 56 extending from the second module member 16 of an adjacent module 12. The body 24 disclosed herein is substantially rectangular, however, the body can be any structure that fixes the link ends 44 relative to each other without departing from the scope of the invention.

The first module member link ends 44 interdigitate with the link ends 56 extending from the second module member 14 of the adjacent module 12 and include coaxial apertures 58 for receiving the hinge pin 22 to pivotally join the adjacent modules 12 together. The apertures 58 are, preferably, circular having a diameter only slightly larger than the diameter of the hinge pin 22 are coaxially formed through the link ends 44 in a direction transverse to the direction of conveyor travel. The apertures 58 are aligned with apertures 72 formed in the link ends 56 of the second module member 16 of the adjacent module 12, and receive the hinge pin 22 to pivotally link the adjacent modules 12 together about the horizontal axis 20 defined by the hinge pin 22 linking the adjacent modules 12 together. Although circular apertures 58 having a diameter only slightly larger than the diameter of the hinge pin 22 are preferred because of the advantages described below, slotted apertures can be used to provide a side flexing chain that can negotiate even tighter curves without departing from the scope of the invention.

The first module member link ends 44 are shaped to allow the chain 10 to back flex as the chain pivots toward the module top surface about the hinge pins. Each link end 44 has a bottom surface 62 joined to the body top 34 by a rounded link end end surface 66. The rounded link end end surface 66 reduces interference with the second module member 16 which allows the chain 10 to backflex. Advantageously, as discussed below, the link end end surface 66 can be shaped to increase or decrease the degree of backflex.

Fingers 76 defining the module top surface extend from each link end 44 of the first module member body 24, across the body top 34, and past the first module member inner side 26 toward the second module member 16 to close the gap between the module members 14, 16 of the module 12. A plurality of the fingers 76 are spaced between each end 30, 32 of the first module member body 24 above the body top 34 and interdigitate with fingers 82 extending from the second module member 16.

The second module member 16 is substantially identical to the first module member 14 and includes a body 84 having an inner side 86 and an outer side 88 joined by ends 90, 92 to define a body top 94 and a body bottom 96. A transverse rib 98 extends downwardly from the body bottom 96 and between the body ends 90, 92 to stiffen the second module member 16. The body 84 disclosed herein is substantially rectangular, however, the body can be any structure that fixes the link ends 56 relative to each other without departing from the scope of the invention.

The second module member link ends 56 extend from the body outer side 88 and interdigitate with link ends 44 extending from a first module member 14 of an adjacent module 12. Each second module member link end 56 has a bottom surface 102 joined to the second module member body top 94 by a rounded link end end surface 104. The rounded link end end surface 104 reduces interference with the first module member 14 of the adjacent module 12 which allows the chain 10 to backflex. Advantageously, the link end end surfaces 66, 104 can have any shape, such as including a straight section, notch, and the like, to vary the interference between adjacent modules and control the degree of backflex allowed.

The apertures 72 are coaxially formed through the link ends 56 in a direction transverse to the direction of conveyor travel, and have a diameter only slightly larger than the diameter of the hinge pin 22. The apertures 72 are aligned with the apertures 58 of first module member link ends 44 of an adjacent module 12, and receive the hinge pin 22 to pivotally link the adjacent modules 12 together. Although circular apertures 72 having a diameter only slightly larger than the diameter of the hinge pin 22 are preferred because of the advantages described below, slotted apertures can be used to provide a side flexing chain that can negotiate even tighter curves without departing from the scope of the invention.

A plurality of the second module member fingers 82 are spaced between the second module member body ends 90, 92, and extend from the link end 56 of the second module member 16, across the body top 94, and past the first module member inner side 86 to close the gap between the module members 14, 16 of the module 12. The second module member fingers 82 interdigitate with the first module member fingers 76 to minimize the gaps between the fingers 76, 82. Advantageously, the top surfaces 108 of the first and second module member fingers 76, 82 define the top surface of the module 12.

In the embodiment disclosed in FIGS. 1–3, the first and second module members 14, 16 are joined by two-bar linkages 110 extending between the inner sides 26, 86 of each module member 14, 16 of the module 12. The linkages 110 allow each module member 14, 16 of the module 12 to pivot independently of the other module member 14, 16 of the module 12 in order to negotiate a curve while maintaining the hinge pins 22 connecting the module 12 to the adjacent modules in contact with the link ends 44, 56 to distribute the chain tension across the width of each module member 14, 16. Although two and four linkages 110 are shown for different width modules, two or more linkages can be provided without departing from the scope of the invention.

Each linkage 110 includes first and second link bars 112, 114 having opposing first and second ends 116, 118. The link bars 112, 114 are substantially identical having yokes 122 formed at each end 116, 118 that couple individual link bars 112, 114 to one another or one of the module members 14, 16. Each yoke 122 includes parallel spaced apart yoke arms 124 having an aperture 126 formed therethrough. The apertures 126 of each arm 124 in a yoke 122 are coaxial for receiving a pivot pin 128, 130, 132 to pivotally join the yoke 122, and thus the end 116, 118 of the link bar 112, 114 on which the yoke 122 is formed, to one of the module members 14, 16 or the other link bar 112, 114.

In the embodiment disclosed herein, the first end 116 of the first link bar 112 is pivotally joined to the inner side 26 of the first module member 14 by a first pivot pin 128. Likewise, the second end 118 of the second link bar 114 is pivotally joined to the inner side 86 of the second module member 16 by a second pivot pin 130 to join the module members 14, 16 together. Preferably, each end 140, 142 of each linkage 110 is pivotally joined to one of the inner sides 26, 86 of each body 24, 84 of the first and second module members 14, 16 by tabs 136 extending inwardly from each of the inner sides 26, 86 of the module members 14, 16. Vertical apertures 138 formed through each tab 136 receive the pivot pin 128, 130 extending through apertures 126 formed through each link end yoke arm 124 and aligned with the vertical apertures 138 to pivotally join the ends 140, 142 of the linkages 110 to the respective module members 14, 16.

In the embodiment disclosed in FIGS. 1–3, each end 140, 142 of each linkage 110 is pivotally fixed to one of the module members 14, 16 by sets of three inwardly extending tabs 136. Each set of tabs 136 are vertically spaced and define two spaces 144. Each space 144 receives one of the arms 124 of one of the yokes 122 to vertically align the apertures 138 formed in the tabs 136 of a set of tabs 136 with the apertures 126 formed in the yoke arms 124. Although tabs 136 are preferred, any method for pivotally joining the linkage ends 140, 142 to the module members 14, 16 can be used, such as inserting pivot pins in holes formed through the module member bodies, without departing from the scope of the invention.

The first and second pivot pins 128, 130 pivotally join the linkage 110 to the first and second module members 14, 16. Each of the first and second pins 128, 130 includes a head end 146 and a tail end 148 that are shaped to secure the pin in the vertical apertures 138 of the tabs 138. The head end 146 includes a cap 150 that cannot pass through the vertical apertures 138 of the tabs 136. A radially outwardly opening groove 154 formed in the tail end 148 of the first and second pivot pins 128, 130 engages a shelf 156 extending radially inwardly from one of the tabs 136 to lock the pivot pin 128, 130 in the vertical apertures 138 relative to the tabs 136 in a snap fit relation. Of course, other methods for securing the first and second pivot pins in the vertical apertures can be used, such as forming the vertical apertures in the tabs with a diameter that is smaller than the diameter of the pivot pin to provide an interference fit the locks the pivot pin in place, retain the tail end with a clip, and the like, without departing from the scope of the invention.

The link bars 112, 114 of each linkage 110 are pivotally joined together by the center pivot pin 132 extending through the aligned apertures 126 of the yoke 122 formed through the second end 118 of the first link bar 112 and the yoke 122 of the first end 116 of the second link bar 114. Preferably, the yoke 122 forming the second end 118 of the first link bar 112 is vertically offset from the yoke 122 forming the first end 116 of the second link bar 114, such that one arm 124 of each yoke 122 is received between the arms 124 of the other yoke 122 to align the yoke apertures 126 of the first and second ends 116, 118 of the second and first link bars 114, 112, respectively.

The center pivot pin 132 extends vertically downwardly past the link bars 112, 114 into a track 160 to form a cam follower 162 that guides the chain 10 along a conveyor path. The cam follower 162 is received in the track 160 defining the conveyor path and formed below the chain 10 in a conveyor frame. A roller 164 rotatably mounted on the cam follower 162 and received in the track 160 reduces friction between the cam follower 162 and track 160. Although a cam follower 162 forming part of the center pivot pin 132 and having a roller 164 mounted thereon is disclosed, the cam follower and/or roller can be omitted, or extend from any of the link bars or module member bodies, without departing from the scope of the invention.

The center pivot pin 132 is longer than the first and second pivot pins 128, 130 to form the cam follower 162, and includes a head end 166 and a tail end 168. The head end 166 includes a cap 172 that axially supports the roller 164. A radially outwardly opening groove 174 formed in the tail end 168 of the center pivot pin 132 engages a clip 176 to lock the center pivot pin 132 in the aligned apertures 126 of the interfitting yokes 122 of the link bars 112, 114. Of course, other methods for securing the center pin 132 in the aligned apertures 126 can be used, such as by an interference fit, snap fit, and the like, without departing from the scope of the invention.

The assembled chain modules 12 are joined together to form a chain 10 by interdigitating the link ends 44 of the first module member 14 with the link ends 56 of a second module member 16 of an adjacent chain module 12, such that the apertures 58, 72 formed through the interdigitating link ends 44, 56 are aligned. The hinge pin 22 is then slipped through the aligned apertures 58, 72 to pivotally link the adjacent chain modules 12 about the hinge pin 22. Although a chain 10 formed from substantially identical modules 12 is disclosed, dissimilar modules including modules known in the prior art can be interspersed between the modules disclosed herein without departing from the scope of the invention. Moreover, the modules 12 can be arranged in a bricklaying fashion, such as shown in FIGS. 1 and 2, to form a modular belt having a width greater than the individual modules.

In use, a plurality of the chain modules 12 are pivotally linked together by a plurality of hinge pins 22 to form an endless chain 10. In the preferred embodiment disclosed herein, each hinge pin 22 is received in apertures 58, 72 formed through the interdigitating link ends 44, 56 of adjacent modules 12 to maintain the hinge pins 22 connecting the module 12 to adjacent modules 12 in contact with the link ends 44, 56 and distribute the tension in the chain 10 across the width of the adjacent modules 12. The linkages 110 joining the first and second chain module members 14, 16 of each chain module 12 allow each module member to pivot and negotiate a curve without while maintaining all of the link ends 44, 56 in tension to distribute the chain tension across the length of the hinge pin 22.

Figure 4:
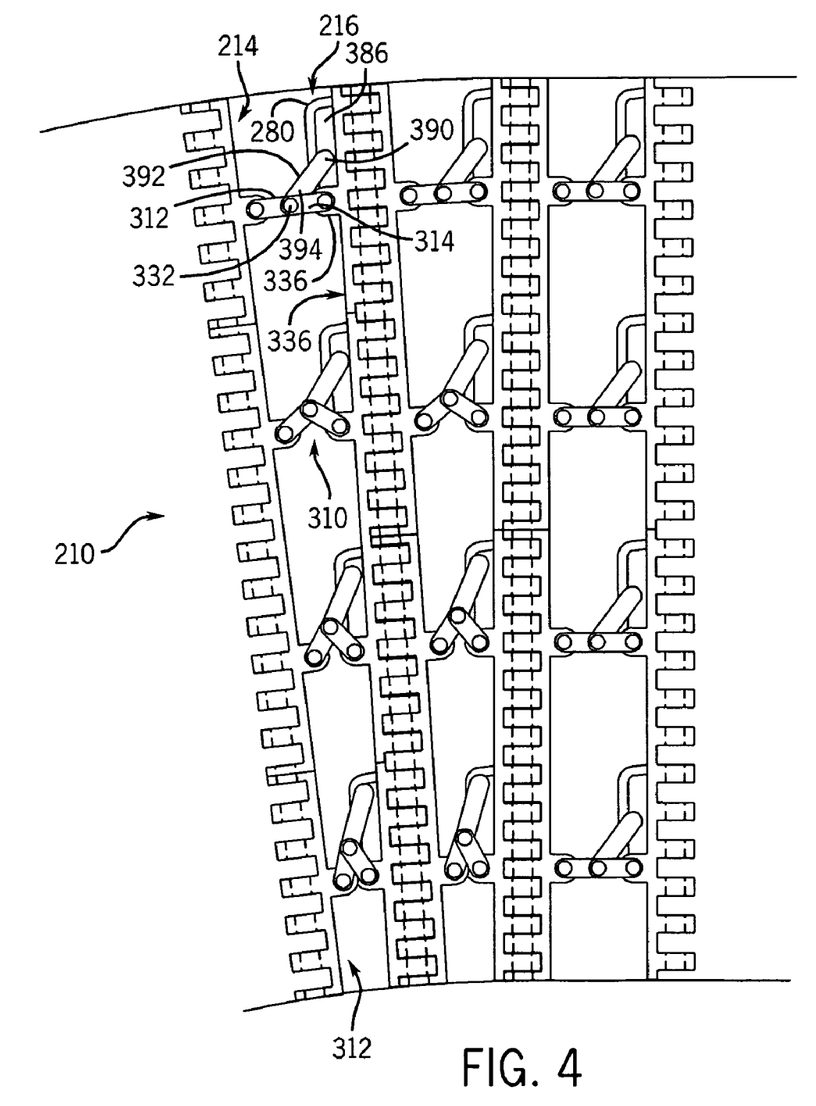
FIG. 4 is a top view of a second embodiment of a side-flexing conveyor chain incorporating the present invention.
Figure 5:
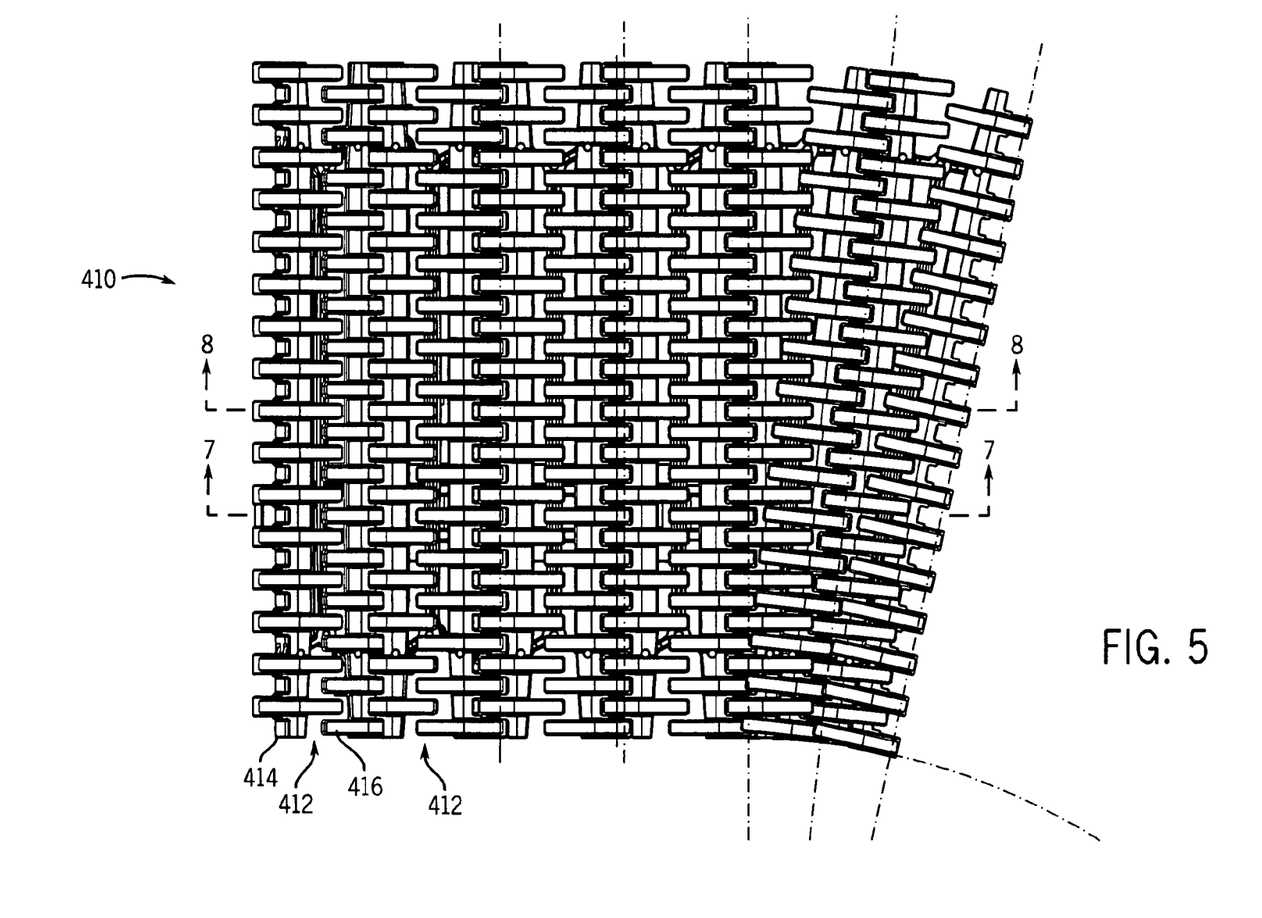
FIG. 5 is a top view of a third embodiment of a side-flexing conveyor chain incorporating the present invention.
Figure 6:
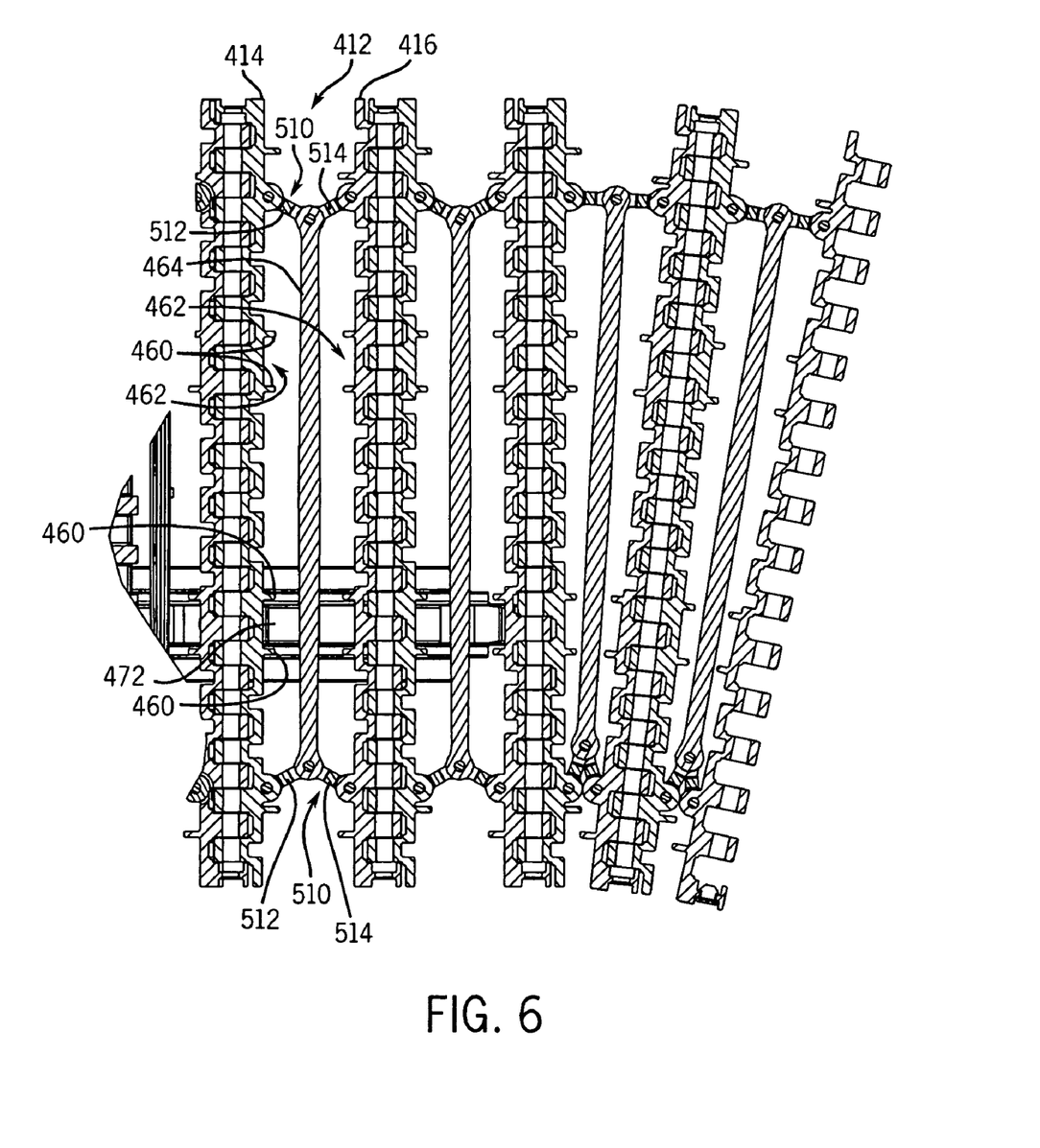
FIG. 6 is a sectional view along line 6—6 of FIG. 5.
Figure 7:
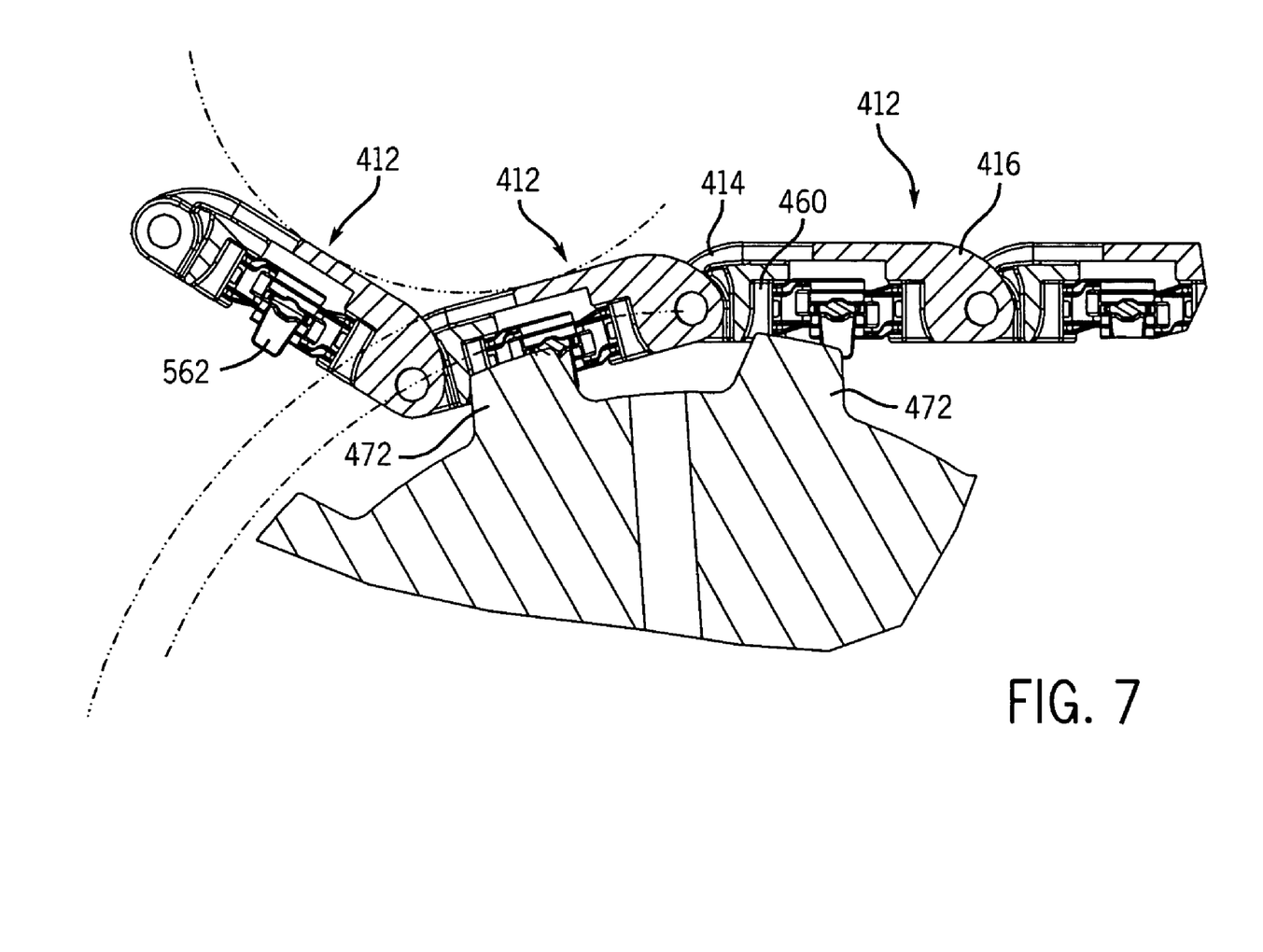
FIG. 7 is a sectional view of the chain of FIG. 5 along line 7—7 of FIG. 6.
Figure 8:
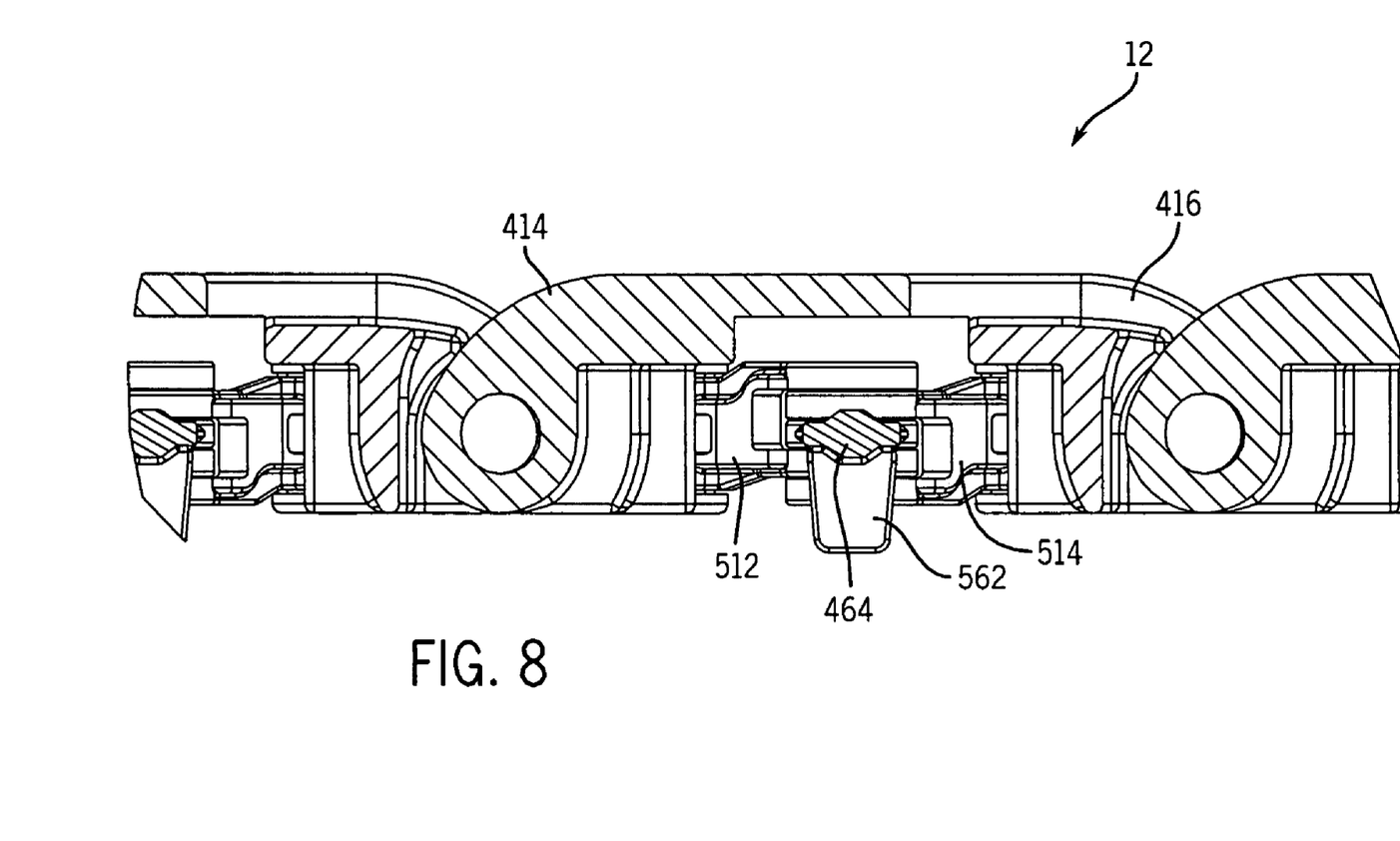
FIG. 8 is a sectional view along line 8—8 of FIG. 5.

In a second embodiment shown in FIG. 4, a chain 210 includes modules 212 having first and second module members 214, 216 joined by linkages 310. The first module member 214 is substantially the same as the first module member 14 described above. The second module member 216 is also substantially the same as the second module member 16 described above with the exception that a rib 380 joined at its ends to the second module member 216 forms a transverse slot 386 adjacent to each tab 336 along the inner side 286 of the second module member 216. The transverse slot 386 slidably receives a pin (not shown) extending vertically from a distal end 390 of a third link bar 392 having a proximal end 394 pivotally joined to the first and second link bars 312, 314 about the center pivot pin 332 of each two-bar linkage 310. Advantageously, the third link bar 392 provides an additional attachment point for the linkage 310 to better distribute the chain tension across the width of the chain module 212.

In a third embodiment of the present invention shown in FIGS. 5–8, a chain 410 includes modules 412 having first and second module members 414, 416 joined by linkages 510. The first and second module members 414, 416 are substantially the same as the first and second module members 14, 16 of the first embodiment described above. In this embodiment, however, pairs of protrusions 460 extending inwardly from the transverse rib 438, 498 of each module member 414, 416 define engagement pockets 462. A sprocket tooth 472 engages the engagement pockets 462 formed on one of the module members 414, 416 to propel the module 412 in a direction of conveyor travel. Although engagement pockets 462 are preferred, the module 412 can be propelled using other methods known in the art, such as by frictionally engaging the chain 410, engaging the link ends 444 of the module 412 with a sprocket, and the like, without departing from the scope of the invention.

As in the first embodiment, two bar linkages 510 join the first and second module members 414, 416 as described above. In the third embodiment, a cross link bar 464 pivotally connected to each of the two bar linkages 510 at the center pivot pin 532 of each two bar linkage 510. As the chain 410 passes through a curve, the cross link bar 464 transfers chain tension from the outer linkage 510 (the linkage adjacent the outer radius of the curve) to the inner linkage 510. Advantageously, by transferring tension between the linkages 510, the chain 410 can accommodate a series of tight curves, or turns, when loaded. Although, a cross link bar 464 joining two two-bar linkages 510 to form a single five-bar linkage is shown, the cross link bar 464 can be used to join two or more two-bar linkages or three-bar linkages without departing from the scope of the invention.

In the third embodiment, a cam follower 562 extending downwardly from the cross link bar 464 guides the chain 410 along a conveyor path. The cam follower 562 is received in a track 560 defining the conveyor path and formed below the chain 410 in a conveyor frame. A roller (not shown) rotatably mounted on the cam follower 562 and received in the track 560 can be provided to reduce friction between the cam follower 562 and track 560. Although a cam 562 follower extending from the cross link bar 464 is disclosed, the cam follower 562 can be omitted, or extend from any of the link bars 512, 514 or module member bodies 424, 484 without departing from the scope of the invention.

Figure 11:
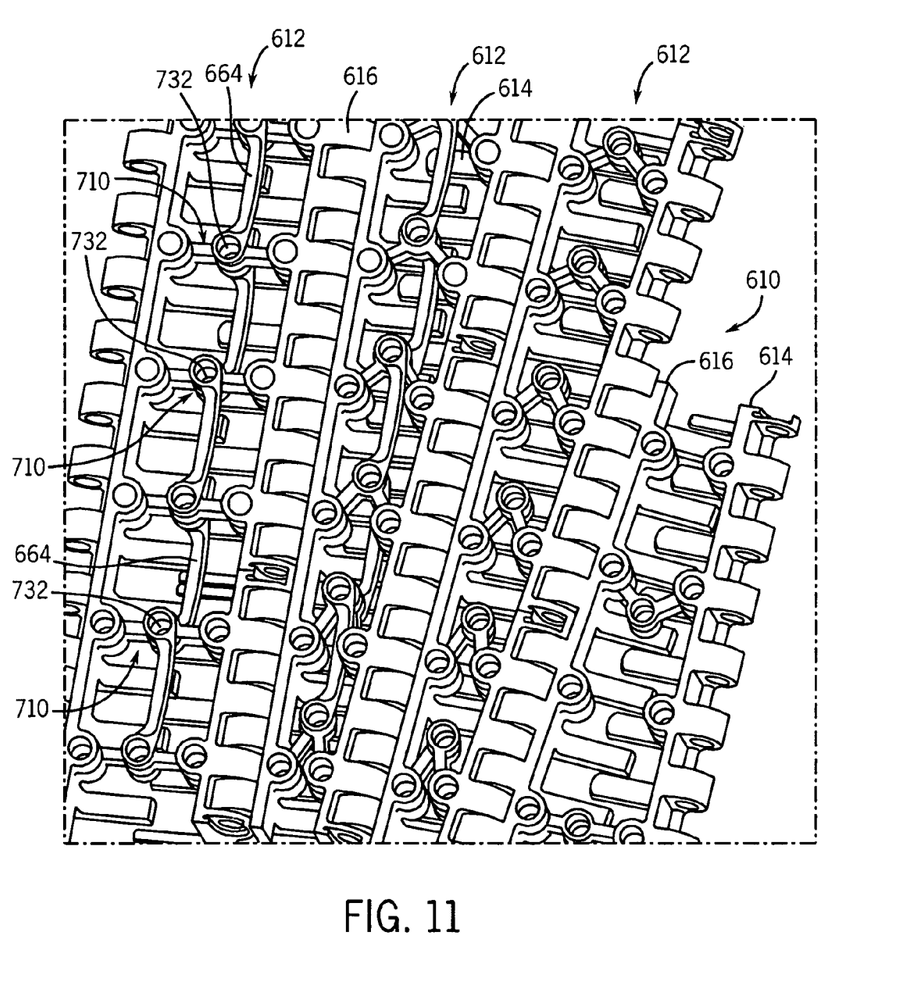
FIG. 11 is a bottom view of a fifth embodiment of a side-flexing chain incorporating the present invention.

In a fourth embodiment shown in FIG. 11, a chain 610 includes modules 612 having first and second module members 614, 616 joined by linkages 710. The first module member 614 is substantially the same as the first module member 14 described above. The second module member 616 is also substantially the same as the second module member 16 described above. A plurality of two bar linkages 710 join the first and second module members 614, 616, as described above. In the fourth embodiment, cross link bars 664 pivotally connect adjacent two bar linkages 710 at the center pivot pin 732 of each two bar linkage 710.

Figure 9:
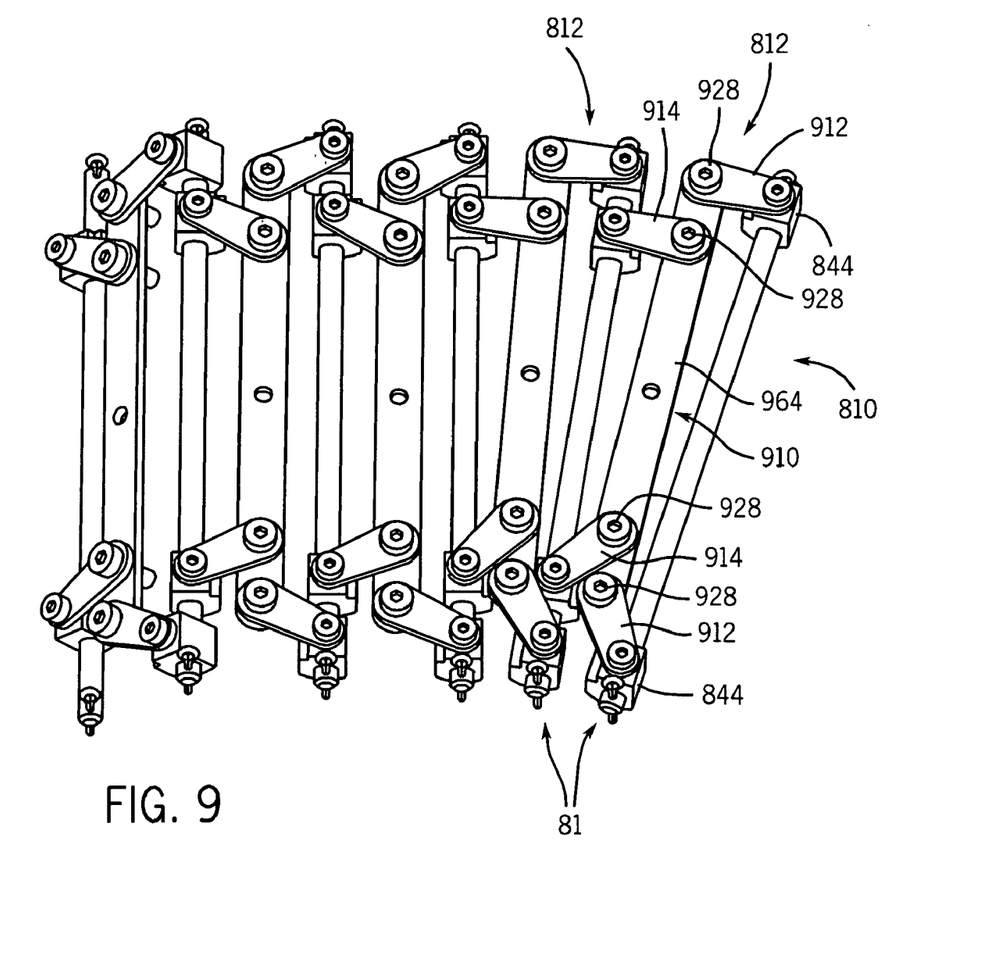
FIG. 9 is a top view of a fourth embodiment of a side-flexing conveyor chain incorporating the present invention.
Figure 10:
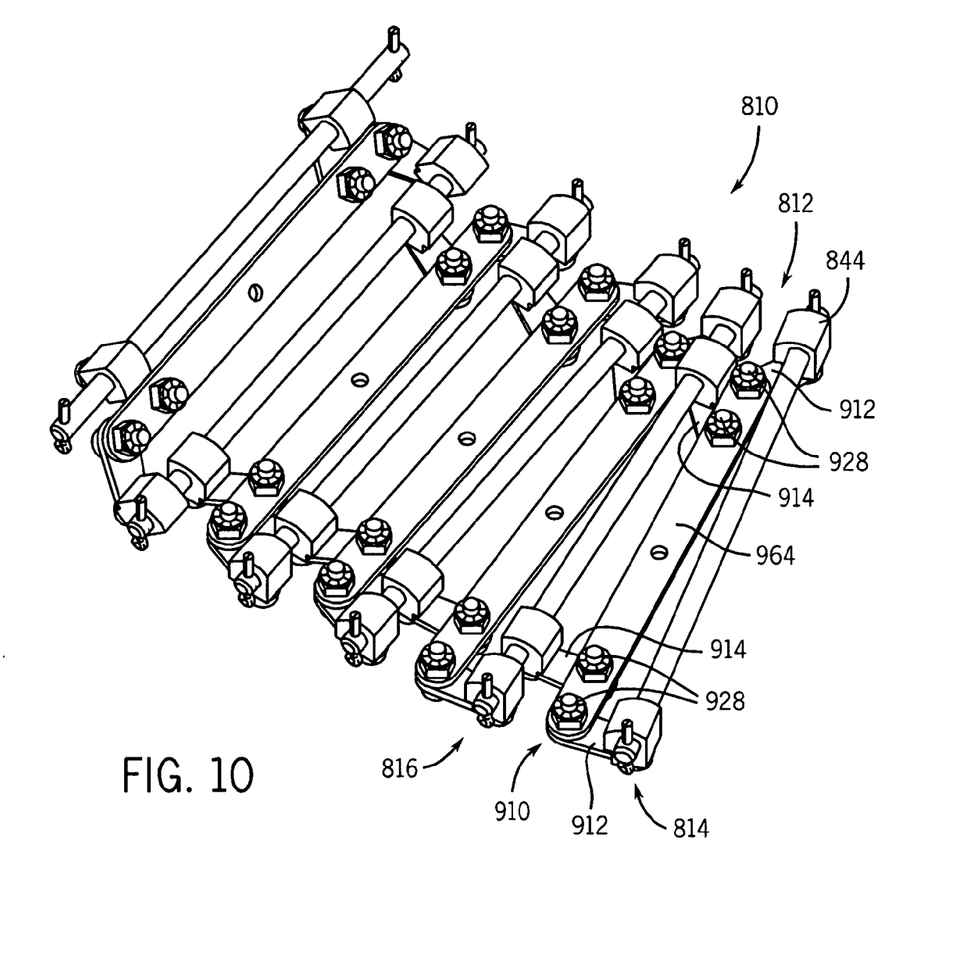
FIG. 10 is a bottom view of the chain of FIG. 9.

In a fifth embodiment shown in FIGS. 9 and 10, a chain module 812 includes four independent link ends 844, 856 joined by a five-bar linkage 910. The five-bar linkage 910 includes four link bars 912, 914 pivotally joined to a cross link bar 964 at pivot points 928 that are not coaxial with each other. The cross link bar 964 joins the four link bars 912, 914 to form the five-bar linkage 910. Each link bar 912, 914 is pivotally connected to one of link ends 844, 856 to form the module 812. Of course, additional link ends can be provided that are joined to the cross link bar 964 by additional link bars without departing from the scope of the invention. As in the other embodiments disclosed above, the link bars distribute tension in the module across the module width.

While there have been shown and described what is at present considered the preferred embodiments of the invention, it will be obvious to those skilled in the art that various changes and modifications can be made therein without departing from the scope of the invention defined by the appended claims.

We claim:

1. A side-flexing conveyor chain module comprising:
  a first module member having a first body extending substantially the width of the first module member, said first module member having first link ends joined to said first body and extending in a direction of conveyor travel away from said first body;
  a second module member having a second body extending substantially the width of the second module member, said second module member having second link ends joined to said second body and extending in a direction substantially opposite to the direction of conveyor travel away from said second body; and
  at least two linkages linking said first and second bodies together, each of said linkages including at least two link bars pivotally joined together.

2. The conveyor chain module as in claim 1, in which at least one of said linkages includes a third link bar having one end pivotally linked to said at least one of said linkages, and said third link bar having an opposing end slidably connected to one of said module members.

3. The conveyor chain module as in claim 1, in which a cross link bar is pivotally connected to said at least two linkages.

4. The conveyor chain module as in claim 1, in which said at least two link bars of at least one of said at least two linkages are pivotally joined together by a pivot pin.

5. The conveyor chain module as in claim 4, in which said pivot pin extends downwardly past said at least one of said at least two linkages to form a cam follower engageable with a track disposed beneath the chain module.

6. The conveyor chain module as in claim 5, in which a roller is rotatably mounted on said cam follower.

7. A side-flexing conveyor chain module comprising:
  a first module member having a first body, said first module member having first link ends extending in a direction of conveyor travel away from said first body;
  a second module member having a second body, said second module member having second link ends extending in a direction substantially opposite to the direction of conveyor travel away from said second body;
  at least two linkages linking said first and second bodies together, each of said linkages including at least two link bars pivotally joined together; and
  a cam follower extending downwardly from at least one of said linkages, said first module member, and said second module member, said cam follower being engageable with a track disposed beneath the chain module.

8. A side-flexing conveyor chain module comprising:
  a first module member having a first body, said first module member having first link ends extending in a direction of conveyor travel away from said first body;
  a second module member having a second body, said second module member having second link ends extending in a direction substantially opposite to the direction of conveyor travel away from said second body;
  at least two linkages linking said first and second bodies together, each of said linkages including at least two link bars pivotally joined together, and
  fingers extending from one of said first and second modules toward the other of said first and second modules.

9. The conveyor chain module as in claim 8, in which said fingers interdigitate with fingers extending from the other of said first and second modules toward said one of said first and second modules.

10. The conveyor chain module as in claim 1, in which at least one of said link bars includes a yoke forming an end of said at least one of said link bars.

11. A side-flexing conveyor chain module comprising:
  a first module member having at least two first link ends;
  a second module member having at least two second link ends;
  a first linkage linking at least one of said first link ends to at least one of said second link ends;
  a second linkage linking at least one of said first link ends to at least one of said second link ends; and
  a cross link bar connecting said first linkage to said second linkage.

12. The conveyor chain module as in claim 11 in which at least one of said linkages includes at least two link bars pivotally joined together.

13. The conveyor chain module as in claim 12 in which at least one of said linkages includes a third link bar having one end pivotally linked to said at least one of said linkages, and said third link bar having an opposing end slidably connected to one of said module members.

14. The conveyor chain module as in claim 11 in which said cross link bar is pivotally connected to said first and second linkages.

15. The conveyor chain module as in claim 12, in which said link bars are pivotally connected to each other by a pivot pin that extends downwardly past said link bars to form a cam follower engageable with a track disposed beneath the chain module.

16. The conveyor chain module as in claim 15, in which a roller is rotatably mounted on said cam follower.

17. The conveyor chain module as in claim 11, in which a cam follower extends downwardly from at least one of said first and second linkages, said first module member, and said second module member, and is engageable with a track disposed beneath the chain module.

18. The conveyor chain module as in claim 11, in which fingers extend from one of said first and second module members toward the other of said first and second module members.

19. The conveyor chain module as in claim 18, in which said fingers interdigitate with fingers extending from the other of said first and second module members toward said one of said first and second module members.

20. The conveyor chain module as in claim 11, in which at least one of said link bars includes a yoke forming an end of said at least one of said link bars.

21. The conveyor chain module as in claim 1, in which said first link ends extend from a body fixing said first link ends relative to each other.

22. A side-flexing conveyor chain comprising:
a first side-flexing chain module including a first module member and a second module member, said first module member including a first body having first link ends extending in a direction of conveyor travel, said second module member including a second body having second link ends extending in a direction substantially opposite to the direction of conveyor travel, each of said second links ends having an aperture formed therethrough for receiving a hinge pin in a direction transverse to the direction of conveyor travel, and at least two linkages connecting said first and second module members together, each of said linkages including at least two link bars pivotally joined together;
a second chain side-flexing module having first link ends interdigitating with said second link ends of said first chain module, each of said first link ends of said second chain module having an aperture formed therethrough for receiving a hinge pin in a direction transverse to the direction of conveyor travel and aligned with said apertures formed through said second link ends of said first chain module; and
a hinge pin received in said apertures to pivotally link said first and second chain modules about an axis transverse to the direction of conveyor travel.

23. The conveyor chain as in claim 22, in which said first and second chain modules are arranged in a brick laying fashion.

24. The conveyor chain as in claim 22, in which at least one of said linkages includes a third link bar having one end pivotally linked to said at least one of said linkages and one of said module members, and said third link bar having an opposing end slidably connected to the other of said at least one of said linkages and one of said module members.

25. The conveyor chain as in claim 22, in which cross link bar is pivotally connected to said at least two linkages.

26. The conveyor chain as in claim 22, in which said at least two link bars of at least one of said at least two linkages are pivotally joined together by a pivot pin.

27. The conveyor chain as in claim 26, in which said pivot pin extends downwardly past said at least one of said at least two linkages to form a cam follower engageable with a track disposed beneath the first chain module.

28. The conveyor chain as in claim 27, in which a roller is rotatable mounted on said cam follower.

29. The conveyor chain as in claim 22, in which a cam follower extends downwardly from at least one of said linkages, said first module member, and said second module member, and is engageable with a track disposed beneath the chain module.

30. The conveyor chain as in claim 22, in which fingers extend from one of said first and second modules members toward said other of said first and second module members.

31. The conveyor chain as in claim 30, in which said fingers interdigitate with fingers extending from the other of said first and second modules toward said one of said first and second modules members.

32. The conveyor chain as in claim 22, in which at least one of said link bars includes a yoke forming an end of said at least one of said link bars.

* * * * *